United States Patent Office 2,937,097
Patented May 17, 1960

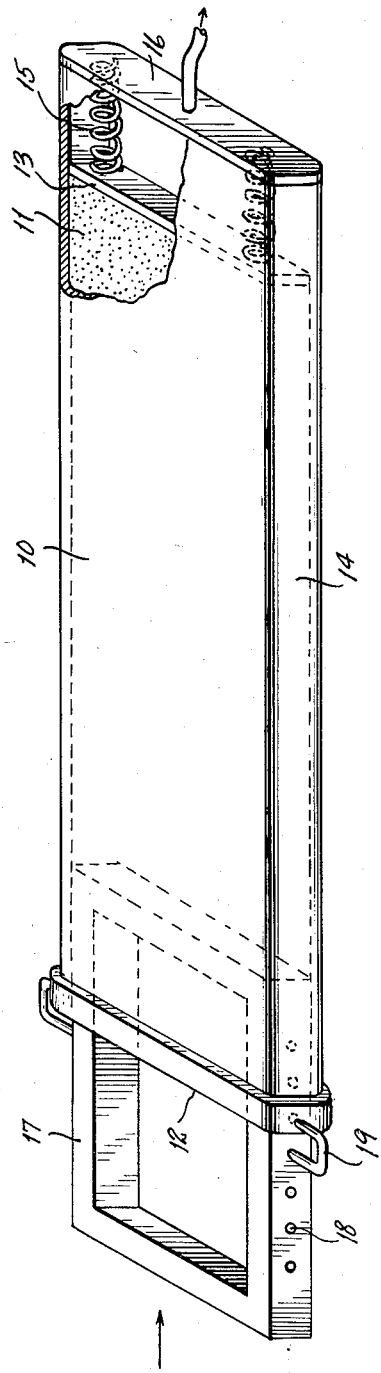

2,937,097

METHOD OF PROCESSING BACON

Howard Ned Draudt, Lafayette, and Clarence M. Harper, Jr., and Virgil R. Rupp, Indianapolis, Ind., assignors to Hygrade Food Products Corporation, Detroit, Mich., a corporation of New York Application October 27, 1958, Serial No. 769,929

5 Claims. (Cl. 99—194)

This invention relates to a bacon manufacturing process and more particularly to a method for processing pork bellies which produces bacon of improved properties and increases the yield of sliced bacon from each pork belly.

Bacon is generally sliced and packaged preliminary to sale and is prepared by processing pork bellies. These bellies are cut into slabs which vary in size and shape depending on the carcass from which they are derived. It has heretofore been the practice in the meat packing industry to process pork bellies by first curing them in some manner. The fresh bellies are cured either by injection of a curing solution, by immersing the fresh bellies into a curing solution, or by covering the bellies with dry curing materials. The dry curing materials include common salt (sodium chloride), sodium nitrite and in some cases sodium nitrate and common sugar. Curing solutions are simply water solutions of these same materials. The bellies to be cured are held in cure until the curing materials have diffused throughout the meat. At this point the cured bellies are quite pliable. After curing the bellies are suspended vertically from racks by means of wire combs which have teeth that grip the bellies. The bellies are then placed in a smoke house and are heated 12 to 24 hours at 120 to 135 degrees F. with the average time being about 18 hours. While in the smoke house the bellies are heated as well as smoked. The bellies are heated in order to obtain fixation of the red pigment (color) and smoked to impart the desirable smoke flavor as well as to import some preserving action.

At the completion of the heating and smoking operation the bacon on the combs is transferred to refrigerated rooms and held there until the bellies are cold enough to be molded and sliced. This requires 12 to 36 hours depending on the thickness of the bacon, the temperature in the room and on the rate of air flow but generally requires approximately 24 hours at a temperature of plus 15 degrees F. When the internal temperature of the bellies reaches 26 to 28 degrees F. the bacon is sufficiently hard to be molded to a nearly rectangular cross section by hydraulic presses. During this pressing operation, however, some tissue breakage occurs since the bacon belly is in a partially frozen condition.

Due to this partially frozen condition of the bacon bellies it is not practical to control its width and thickness since the tissue breakage that would occur with the large dimensional changes required in many cases is prohibitive. In addition even after pressing the bacon bellies do not retain the exact shape of the mold but to a small and significant degree partially return to their original shape.

The chilled bacon bellies are then sliced and packaged with an appreciable loss in yield of first grade sliced bacon. The common yield of first grade sliced bacon from bacon bellies produced under present operating methods is approximately 70 to 85 percent and averages 82 percent. One disadvantage of the present method of processing bacon is that the appearance of first grade sliced bacon in the package is not as good as is desirable since the slices are not uniform in width and thickness.

In addition the edges of the sliced bacon are not even due to the partial return to original shape of the bacon belly after molding.

Another disadvantage of the present method of processing bacon is the long heating required while heating in smoke houses since water evaporates through the lean portion and maintains the temperature of the exposed lean portion lower than the rest of the bacon belly due to the cooling effect of evaporation. The fixation of the red pigment (color) is very critical as to the time and temperature required and due to the cooling effect of evaporation the local variation in temperature of a bacon belly varies widely during heating. With a heating time averaging approximately 18 hours the surface of the bacon belly becomes sufficiently dry that all areas of the belly can rise to high enough temperatures for a long time to fix the red color. This variation affects the stability of the red pigment and results in discoloration of the sliced bacon when exposed to light and air.

With the present method of processing bacon it is not possible to overcome this variation in temperature simply by raising the operating temperature in the smoke house since an increase of only 5 to 10 degrees F. is enough to cause partial rendering of the fat in the bacon. This condition is referred to as cooking of the bacon and results in a finished product that is very friable and which shatters on slicing. When this condition occurs, the loss in yield of first grade product at the slicing operation greatly outweighs the advantage of quicker and better color fixation.

Further disadvantages of the present method of processing bacon are the time required for processing and the reduction in yield due to the use of combs to hold the bacon bellies. The total time required to process cured bacon bellies under the present method is a minimum of 36 hours, of which 18 hours is required for heating and smoking and a minimum of 18 hours for chilling. The use of combs for holding the bacon bellies is undesirable since holes are formed in the bellies where the hooks on the combs penetrate the meat. This causes several slices from each belly to break up on slicing and results in an average loss of two slices from each bacon belly.

In view of the foregoing it is one of the objects of the present invention to provide a method for processing bacon which increases the yield of first grade finished products.

Another object of the present invention is to provide a method for processing bacon which results in better color stability and evenness of color.

For a better understanding of the present invention as well as further objects and features thereof reference is made to the following detailed description to be read in conjunction with the accompanying drawing.

In the drawing the single figure is a perspective view of one type of mold that may be used in processing bacon bellies in accordance with the method of the present invention.

In accordance with the method of the present invention the bacon bellies are first cured in a manner similar to that utilized in present methods of processing bacon. The cured bacon bellies are then placed in molds which are designated in general by the numeral 10. These molds 10 are generally rectangular in cross section and have a width and thickness slightly greater than the average width and thickness of the bacon bellies being processed. As an example if the average weight of the bacon bellies being processed is 10 to 12 pounds the mold would be approximately 1¾ inches thick, 9 inches wide and 27 inches long. The mold is fixed in width and thickness but variable in length. The molds are preferably constructed of material having a high rate of heat transfer such, for example, as stainless steel which has a high rate of heat transfer and is readily cleaned.

The bacon belly, which is designated generally by the numeral 11, is inserted in the open end 12 of the mold 10 until it abuts against plate 13. The plate 13 extends transversely between the sides 14 of the mold 10 and is spring biased by springs 15 which abut against or are secured to the plate 13 and the closed end 16 of the mold 10. After the bacon belly 11 is in position in the mold 10 the drawer 17 is inserted in the open end 12 of the mold 10 until it abuts against the bacon belly. The bacon belly is molded to a uniform width and thickness by applying pressure to the drawer 17 and thereby compressing the belly between the drawer and the plate 13. If desired a vacuum may be drawn from the closed end 16 of the mold 10 to aid in inserting and compressing the belly in the mold. Due to the fact that the bacon is quite pliable after curing and during compression in the mold 10 there is no tissue breakage while the belly is being compressed and molded to a uniform cross section.

When the bacon belly has been compressed to a uniform width and thickness the source of vacuum is removed and the drawer 17 is secured in position. This can be accomplished by providing the sides of the drawer with indentations or openings 18 adapted to be engaged by a hook or clamp 19 secured to the mold. In this manner the belly 11 can be maintained in its compressed condition during subsequent processing operations. It is to be understood that any mold can be used to carry out the present invention and that the mold illustrated is only one type that can be used.

The mold containing the cured and compressed bacon belly is then placed in a hot water bath where the bacon bellies are heated by conduction. The heating time required is only 2 to 4 hours with a 3 hour average as contrasted to 12 to 24 hours with an 18 hour average required with the present methods of processing bacon bellies. This reduction in heating time is possible since better heat transfer is obtained with metal molds immersed in hot water than from air circulation such as in a smoke house. The temperature of the belly in the mold can also be accurately controlled since there are no indeterminate effects of variables due to moisture evaporation or air circulation. In addition it is easier to control the temperature of a water bath than of an air stream. The bacon bellies may be heated with this method in approximately 2 to 4 hours using a hot water bath temperature of 125 to 140 degrees F. It has been found that optimum results are obtained for a mold having a thickness of 1¾ inches by heating for 3 hours in a hot water bath maintained at 135 degrees F.

After heating the bacon bellies are removed from the molds and smoked either by subjecting them to concentrated smoke or to electrostatic smoking. The bacon bellies are either laid flat on a wire or bar grid in a smoke house, or placed on a conveyor belt which carries them through the smoking operation. The conveyor belt carrying the bacon bellies is preferably constructed of open mesh wire in order to permit simultaneous smoking of both sides of the bacon belly. The time required for smoking depends upon whether concentrated smoke or electrostatic smoking is utilized. With concentrated smoke such for example as the smoke from burning sawdust which is blown into the smoke house the time required is 1 to 3 hours while if electrostatic smoking is used the time required is only 4 to 8 minutes.

If desired the bacon bellies may be smoked immediately after curing and before they are placed in molds. It has been found that satisfactory bacon can be produced by subjecting the cured bellies before heating to concentrated smoke for 2 hours or to electrostatically precipitated smoke for 4 to 8 minutes. The preferred method however is to smoke after heating rather than after curing and before heating. After smoking, if this was done after heating and not after curing, the bacon bellies are returned to the same or to similar spring biased molds and are chilled. If the bacon bellies were smoked after curing and before insertion in the molds, the bacon bellies are not removed from the molds for smoking between the heating and chilling operation but are chilled in the same molds immediately after heating. In the event the bacon bellies are removed from the mold for smoking after the heating but before the chilling operation, any misshaping of the meat that occurred during smoking is corrected when the bacon bellies are returned to the molds for chilling.

The bellies in the molds are preferably chilled by immersing the molds in a brine solution of approximately 10 degrees F. The molds are retained in the brine solution for approximately 1½ to 3 hours, depending on the temperature of the solution and the thickness of the mold, at which time the average internal temperature of the meat has dropped to a point where the meat is readily sliceable. If desired the bellies in the molds may also be chilled by placing the molds in a refrigerated room, but if this method of chilling is used the time required for chilling is almost as great as with presently used methods of chilling.

After chilling the bacon bellies are either removed from the mold by a ram and then held in a cold room for 1 hour to equalize the temperature of the heat, or else the bacon bellies in the molds are held in a cold room for approximately 1 hour to equalize the temperature of the meat, and then the bellies are removed from the molds with a ram. The temperature and time in the cold room are not critical but it has been found that holding the meat for 1 hour in a cold room at 26 to 28 degrees F. gives good results. After removal from the mold and equalization of temperature the bacon is ready for slicing.

With bacon processed in accordance with the method of the present invention it has been found that the first grade sliced bacon obtained from each belly is 90 to 92 percent of the original weight of the raw belly as compared to 82 percent with present methods of processing bacon. In addition the appearance of the sliced bacon in the package is superior to that produced by present methods due to the fixed dimension and close conformation to a rectangular shape of the slices produced by the method of the present invention. The number of slices per pound is also the same due to the uniform cross section of bacon bellies produced with the new method.

It has been found that the desirable red color of sliced bacon from bacon bellies processed in accordance with the present invention does not turn to an undesirable brown or black upon exposure to light or air as rapidly as bacon produced with existing methods. This results in greater color stability. It can therefore be seen that there are numerous advantages to the method of the present invention in addition to decreasing from approximately 36 to 8 hours the total time required for heating, smoking and chilling the cured bellies in preparation for slicing.

We claim:
1. A method of processing a cured pork belly to provide an improved bacon product comprising compressing said cured belly in a mold of uniform cross-section to conform said belly thereto, heating said belly in said mold while so compressed to obtain color fixation thereof without distorting said belly, said belly being heated by placing said mold with said belly therein for a period of from 2 to 4 hours in a hot water bath at a temperature within the range from about 125 degrees F. to 140 degrees F., removing the belly from said mold and smoking said belly, replacing said belly in said mold, chilling said belly in said mold to provide for slicing a processed bacon belly having a uniform cross-section, said belly being chilled by placing said mold with said belly therein for a period of from 1½ to 3 hours in a cold fluid at a temperature of about 10 degrees F., said steps of heating and chilling being performed while said belly is enclosed in said mold.

2. A method of processing a cured pork belly in accordance with claim 1 wherein said belly is smoked by subjecting said belly to electrostatic smoking for a period of from 4 to 8 minutes.

3. A method of processing a cured pork belly in accordance with claim 1 wherein said belly is smoked by subjecting said belly to concentrated smoke for a period of from 1 to 3 hours.

4. A method of processing a cured pork belly in accordance with claim 1 wherein said mold with said belly therein after removal from said cold fluid is placed in a cold room at a temperature within the range from about 26 degrees F. to 28 degrees F. for a period of about 1 hour to equalize the temperature of said belly.

5. A method of processing a cured pork belly to provide an improved bacon product comprising smoking said belly, compressing said cured and smoked belly in a mold of uniform cross-section to conform said belly thereto, heating said belly in said mold while so compressed to obtain color fixation thereof without distorting said belly, said belly being heated by placing said mold with said belly therein for a period of from 2 to 4 hours in a hot liquid bath at a temperature within the range from about 125 degrees F. to 140 degrees F., and chilling said belly in said mold to provide for slicing a processed bacon belly having a uniform cross-section, said belly being chilled by placing said mold with said belly therein for a period of from 1½ to 3 hours in a cold fluid at a temperature of about 10 degrees F., said steps of heating and chilling being performed while said belly is enclosed in said mold.

References Cited in the file of this patent

UNITED STATES PATENTS

| | | |
|---|---|---|
| 2,119,716 | McKee | June 7, 1938 |
| 2,388,823 | Britt | Nov. 13, 1945 |
| 2,528,204 | Zwosta | Oct. 31, 1950 |
| 2,553,533 | Komarik et al. | May 15, 1951 |
| 2,565,454 | MacKenzie et al. | Aug. 21, 1951 |